Oct. 12, 1937.   E. G. STAUDE   2,095,841
POWER AMPLIFIER FOR MOTOR CAR CONTROLS
Filed Feb. 17, 1932   4 Sheets-Sheet 1
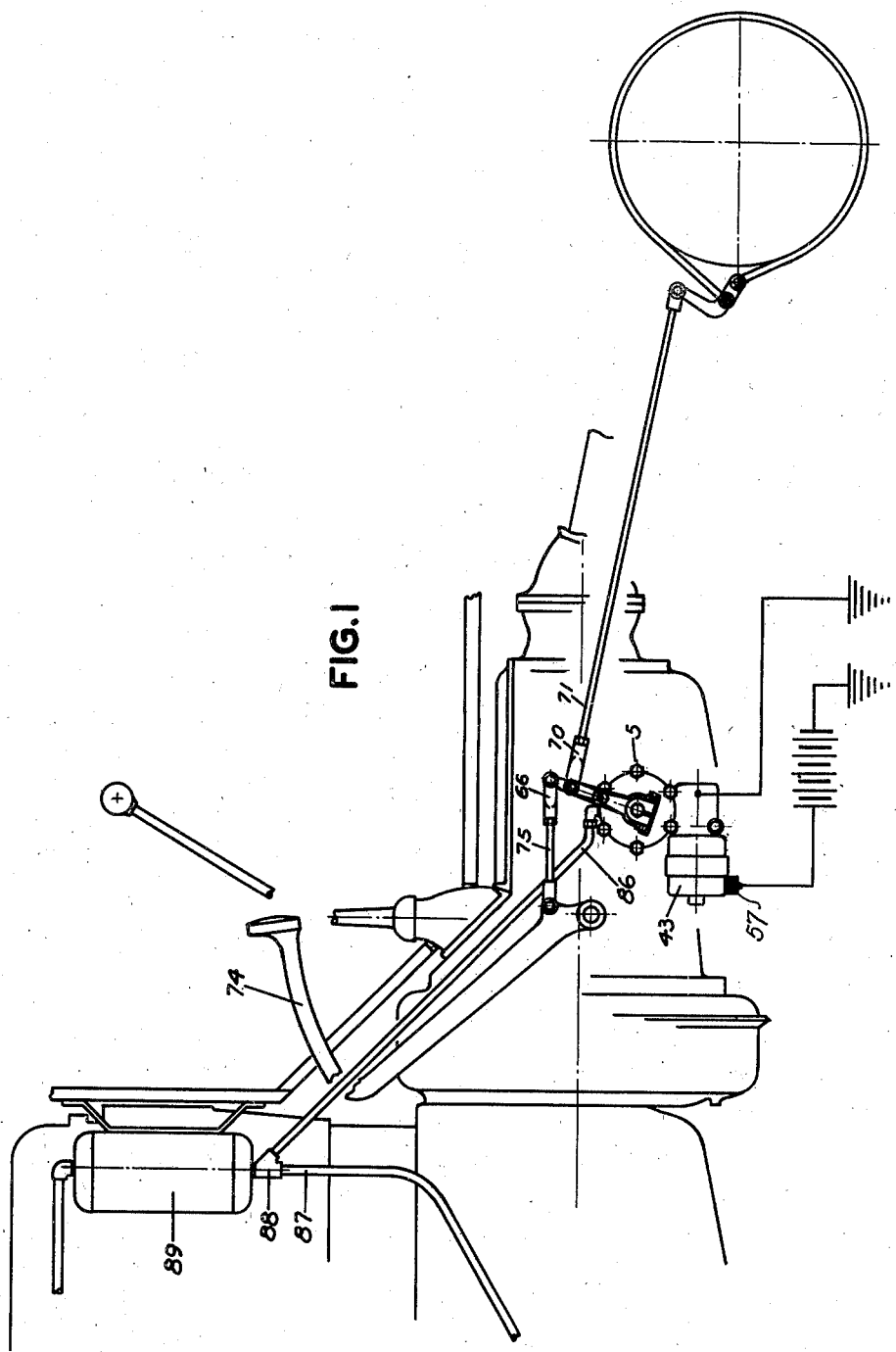
INVENTOR
EDWIN G. STAUDE
BY Paul, Paul & Moore
ATTORNEYS

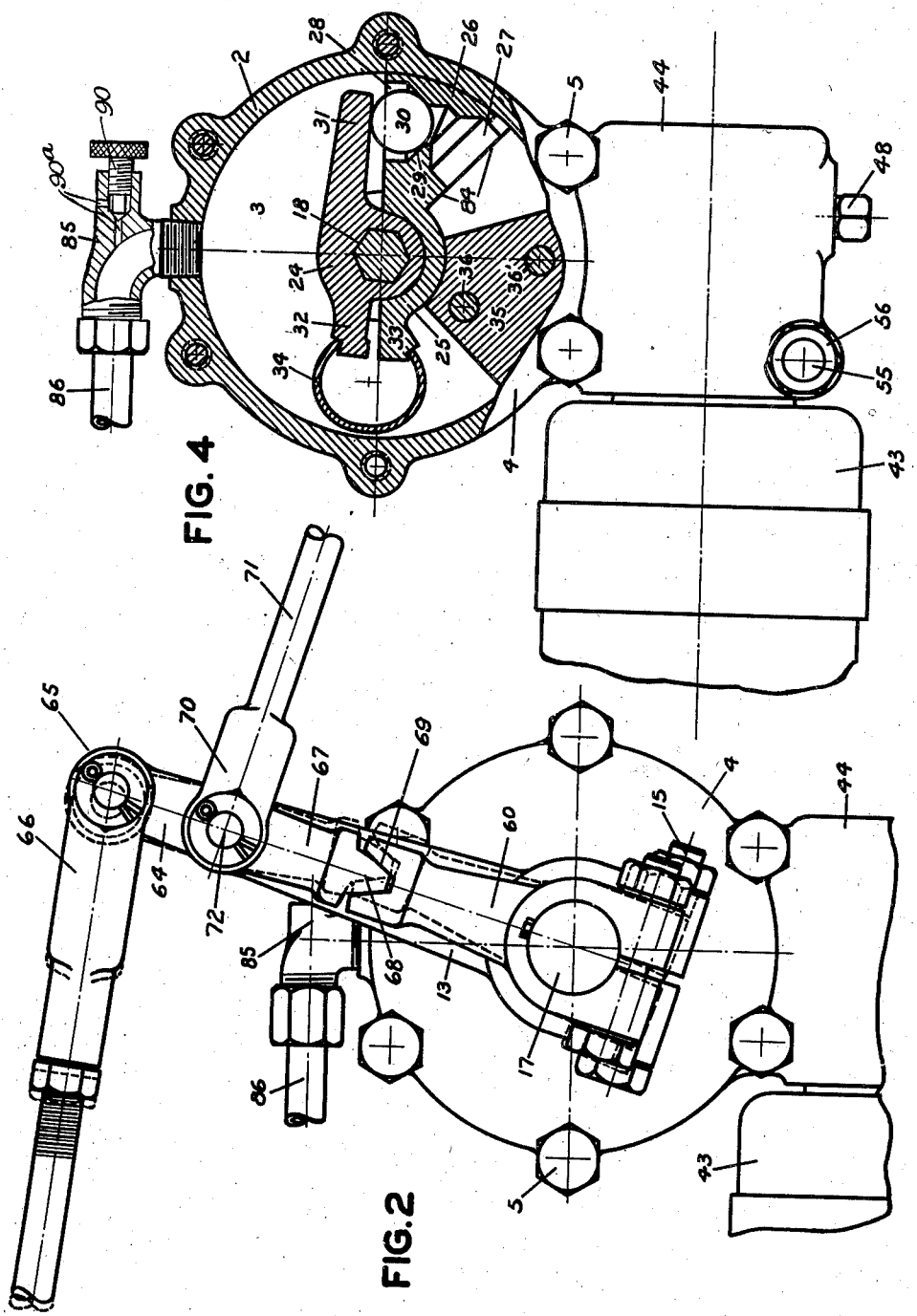

Oct. 12, 1937.     E. G. STAUDE     2,095,841
POWER AMPLIFIER FOR MOTOR CAR CONTROLS
Filed Feb. 17, 1932    4 Sheets-Sheet 3
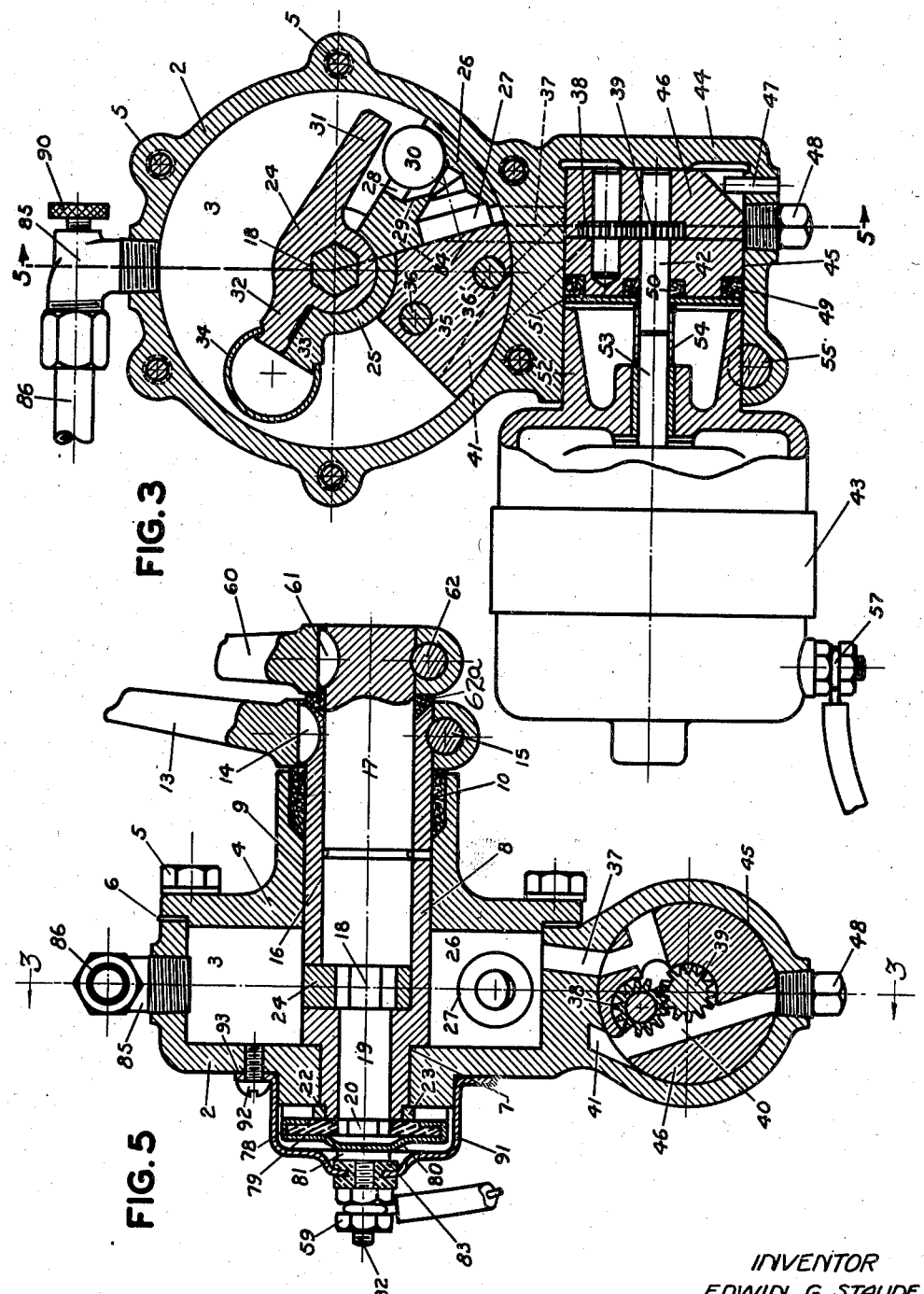
INVENTOR
EDWIN G. STAUDE
BY Paul, Paulo Moore
ATTORNEYS Oct. 12, 1937.  E. G. STAUDE  2,095,841
POWER AMPLIFIER FOR MOTOR CAR CONTROLS
Filed Feb. 17, 1932  4 Sheets-Sheet 4
FIG. 7
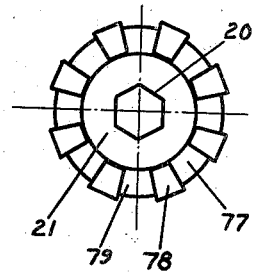
FIG. 8
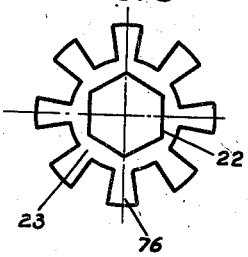
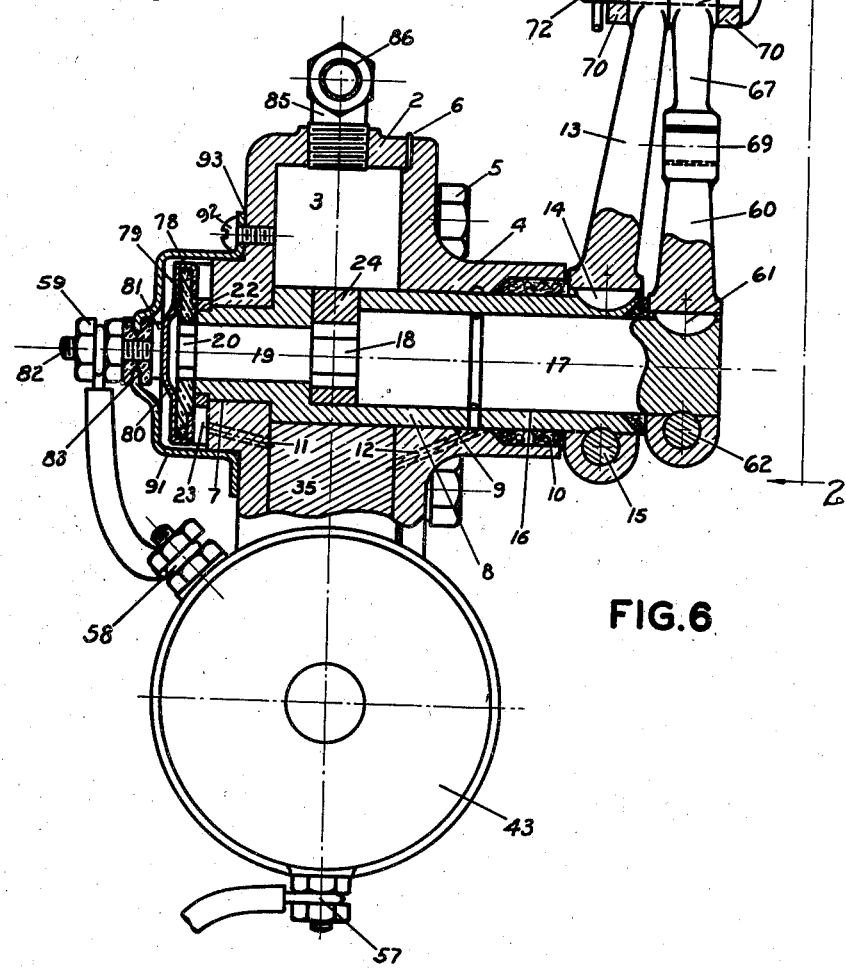
FIG. 6
INVENTOR
ERWIN G. STAUDE
BY Paul, Paul & Moore
ATTORNEYS Patented Oct. 12, 1937

2,095,841

UNITED STATES PATENT OFFICE 2,095,841

POWER AMPLIFIER FOR MOTOR CAR CONTROLS

Edwin G. Staude, Minneapolis, Minn.

Application February 17, 1932, Serial No. 593,541

30 Claims. (Cl. 60—52)

This invention relates generally to improvements in fluid actuating mechanisms, and finds valuable application for supplementing and progressively amplifying the manual effort for operating motor car brakes. This invention is an improvement over that shown in my Patent No. 1,785,052.

An important object of my present invention is to provide a mechanism which will be self-contained and of unusually small size, small size being a very desirable object. Other objects are: to provide a mechanism in which the fluid will be automatically replenished if seepage occurs through faulty packing, or by evaporation; to provide a construction wherein power is transmitted by a radial or swinging element instead of by a piston, thereby greatly simplifying the packing arrangement and substantially avoiding exposure of any sliding surface, at the outside of the casing; to provide an exceedingly simple electric switching device having contact surfaces of large area, thus reducing arcing and permitting a strong construction; to provide a simplified means for obtaining proportional back pressure against the pedal, so that the driver of the motor vehicle may "feel" the required proportional increase to pedal pressure and degree of pedal motion when additional braking effort is required to the end that he can have full control of the braking means at all times without danger of having the power amplifier overrun and supply more power than is needed, which would result in locking the wheels when not desired; to provide an amplifying unit which is of small size and which can be easily and quickly installed at minimum expense, and which after installation requires no further attention; and to provide an electric motor mounting arrangement, whereby the motor may be removed for repair or replaced as quickly and simply as an electric light bulb.

Objects, features and advantages of the invention will appear from the description of the drawings forming a part of this application, and in said drawings Figure 1 is a somewhat diagrammatic side elevation, illustrating one application of my invention;

Figure 2 is a full sized end elevation of the power amplifier unit, as viewed on line 2—2 of Fig. 6, and showing only part of the motor and pump;

Figure 3 is a sectional end elevation taken on line 3—3 of Fig. 5, and illustrating the manner of mounting the electric motor and its connections with the pump, and with the power control valve members, in valve-open position;

Figure 4 is a view somewhat similar to Figure 3, except that the valve members are shown in closed and advanced positions, as when power is being applied to the brakes;

Figure 5 is a section on the line 5—5 of Figure 3;

Figure 6 is a sectional elevation similar to Figure 5 except that the motor is shown to illustrate the connection of one of its terminals with the switch;

Figure 7 is a detail of one of the rocking switch members; and

Figure 8 is a detail of the other switch member which cooperates with the member shown in Figure 7 for opening and closing the circuit when required.

In the drawings, see Figure 5, 2 represents a body or housing having a cylindrical chamber 3, numeral 4 indicates a cover for closing the open side of the chamber 3, said cover being secured by suitable cap screws 5 clamped down over a usual packing ring 6 to obtain a liquid tight joint.

The casing 2 has a bearing opening 7 in which is journaled a rock-shaft 8, and the cover 4 has a bearing opening 9 in which the opposite end of the shaft 8 is journaled. The member 8 is shouldered to bear against the inner face of the chamber 3 adjacent the opening 7, and to prevent fluid from escaping through the bearing in the cover 4, the packing 10 is provided. To prevent oil from escaping through the hole 7 when under pressure, there is provided a passage 11, shown in dotted lines (see Figure 6) for leading oil of seepage back to the low pressure side. There is also provided a passage 12 in the cover 4 to lead oil of seepage back to the low pressure side.

On one end of the rocking control member 8, there is provided an arm 13 which acts as an output lever and holds the seal 10 in place, secured by a Woodruff key 14 and a clamp cap screw 15. The rocking member 8 is tubular and provides a bearing bore 16 adapted to receive and house a rock-shaft 17, or control member having a reduced hexagonal portion 18 within the chamber 3. The member 17 further has a reduced portion 19 having a bearing in the correspondingly reduced bore portion of the control member 8. The portion 19 has a hexagonal extension 20 to which one of the switch members 21, shown in Figure 7, is non-rotatably secured. The shaft 8 also has a reduced hexagonal surface 22 to which the member 23, shown in Figure 8, is non-rotatably secured. Non-rotatably secured on the hexagonal surface 18 of rock-shaft 17 is a control member 24, radial with respect to the concentric axes of rotation of the control members 8 and 17, and operating in chamber 3. Formed integral with the rock shaft 8 and also operating in the chamber 3, see Figures 3 and 4, is a member 25 having a radial extension 26 having a liquid tight sliding fit, with the cylindric inner surface of the chamber and acting as an oscillating vane. A passageway extends through the radial member 26 and is formed by two intersecting bores 27—28, the latter having a ball valve seat 29 with which a ball 30 cooperates to close the passage. The ball is arranged at the outlet end of the passage and is pressed into position by a valve lever arm or extension 31 of the member 24. Member 24 has an extension 32 and member 25 has an extension 33, and spring 34 acts on these extensions to normally hold arm 31 away from the ball 30, see Figure 3, so that the passage of the vane is, therefore, open to allow fluid flow therethrough. The passage is a part of the fluid circuit.

To partition the chamber 3 so that fluid may be caused to move the vane 26 when pressure is generated, a block 35 is used and is held in position by dowels and rivets 36 and 36'. In order to circulate fluid in the chamber 27, a passage 37, shown in dotted lines in Figure 3 and full lines in Figure 5, communicates with the pressure side of a pair of pump gears 38 and 39 operative in block 46. The intake sides of the gears are in the passage 40 of the block and this passage 40 connects with the low pressure side of the chamber 3 by the passage 41 (see dotted lines in Figure 3).

In order to supply power to the drive shaft 42 of the pump gear 39, there is provided a small electric motor 43 which is run at very high speed, to wit between 15,000 and 20,000 revolutions per minute. This small size high speed motor drives the very small pump gears in a manner to give ample volume capacity, because of the high speed, and to give the needed high pressure. It has been found that when these pump gears run between 15,000 and 20,000 revolutions per minute, pressures between 500 and 600 pounds per square inch are produced. This will give 175 pounds additional pull on the brake rod with a 50 pound pedal pressure on the full size unit shown.

Since the maximum torque of the motor is somewhat below its maximum speed, this has the advantage of high speed for taking up any slack in the fluid circuit, and following up pedal motion. Directly as braking force is required the motor speed drops and the required pressure is built up. The motor is so limited in its torque capacity, that pressures beyond 600 pounds, let us say, will slow the motor down to a speed at which seepage of the fluid past the pump gears prevents any increase in pressure, obtaining thereby the very desirable features, that it is impossible to stall the motor, and that a fluid pressure by-pass valve is unnecessary. This is a valuable feature of the invention.

The method of mounting the motor is a feature. The casing of the unit has an extension 44 which is bored as shown at 45, to provide a pump chamber. A pump block or body 46, as a unit, fits the bore, and is assembled by axial motion (see Figure 3). After assembly, motion is prevented by the dowel pin 47. A plug 48 permits drainage of sediment from passage 40, see Figure 5.

Suitable annular packing 49 is provided to prevent low pressure fluid from seeping past it towards the motor, and packing 50 is provided around the pump gear shaft 42, the packings being held in place by a plate 51 secured to the block by suitable screws (not shown).

The manner of mounting the motor is a feature. The motor casing 43 is provided with an annular extension 52 fitting into and closing one end of the pump chamber. The end of the driving shaft 53 of the motor abuts the end of the drive shaft 42 of the pump gear 39. Over the ends of the drive shaft 53 of the motor and the driven shaft 42 of the pump gear 39, a simple coil spring 54 is arranged. This coil spring is wound several thousandths smaller in diameter than the shafts and is wound in such direction that, as the motor shaft rotates, it will tend to wrap itself first upon the drive shaft 53 and then upon the driven shaft 42, and thus constitute a power transmitting connection, and feature of the invention. This means of coupling is exceedingly simple and entirely practicable.

The motor is secured by a clamping bolt 55 hollowed out to conform to the curvature of member 52 so that when it is translated by means of a nut 56, see Figure 4, it will securely clamp the motor in position. By releasing the nut 56, the motor may be pulled out and either the spring clutch member 54 remains on the shaft 42 or it remains on the shaft 53 of the motor. There is no need to use any particular care in either connecting or disconnecting the motor. In connecting, all that is necessary is to push the motor in until the ends of shafts 53 and 39 meet, and this condition is easily sensed. Afterwards, nut 56 is tightened to securely clamp the motor in operative position.

The circuit for the motor is exceedingly simple, as is shown in Figures 1 and 6. One of the motor terminals 57 is connected with the battery, and motor terminal 58 is connected to the switch post 59. The switch is composed of the two elements shown in Figures 7 and 8, which are controlled by the rock-shafts, in a manner to be described.

In order to rock the shaft 17, see Figures 2 and 6, there is provided a valve controlling lever or input lever 60 secured to shaft 17 by the Woodruff key 61 and clamping bolt 62 and which holds a packing seal 62a in place on the shaft 8. At the top of the arm 13, there is an eye 63 which receives the pivot 72 of a lever 64 which acts as an input equalizing lever or reversing lever, having its upper arm 65 connected to the clevis connection 66 of the brake foot pedal 74, and having its lower arm 67 provided with a tooth 68, in spur gear relation as at 69, with the upper end of radial arm 60 secured as at 61—62 to rock-shaft 17.

The brake line connection is by means of a clevis 70 of brake rod 71 secured to the pivot pin 72, which pin passes through the clevis and through an opening 73 in the lever 64, and also through eye 63 of radial arm 13. When the pedal 74 is depressed, there is a pull on the rod 75 which acts as an input member and clevis member 66 and lever 64 to rock arm 60 to the dotted position shown in Figure 2. This rocking movement to the dotted position oscillates the shaft 17 and moves arm 31 (see Figure 4) to move the ball 30 to blocking position. By this motion, the switch is also closed. In other words, shaft 17 rocks member 24, and extension 31 is moved against the ball 30 to force it against the seat 29 to block fluid circulation. This action takes place against the tension of the spring 34, which spring normally acts to position arm 31 as in Figure 3. Also, as shaft 17 is rocked, see Figures 6, 7 and 8, switch member 21 is rotated slightly to circuit-closed relation with switch member 23 carried by shaft 8. The extensions 76, see Figures 7 and 8, normally are opposed to the spaces 77 of the member 21 and when the rocking action takes place, extensions 78 move into contact with the extensions 76, of switch member 23. The member 78 is insulated at 79 from the shaft 17, and has a dished portion 80, see Figure 6, against which the head 81 of a binding post 82 bears. The binding post is also insulated as shown at 83. The insulation 83 is mounted in the cover 91, which encloses the entire switch and is secured to the body 2 by screws 92. Oil tightness is obtained by suitable packing material, the position of such material being indicated by numeral 93.

Operation

From the above description it is clear that normally the electric circuit for the motor is open; that is the extensions 76 are opposed to the spaces 77 of the member 21, and the motor is idle. Directly as braking pressure is applied to the pedal 74, shaft 17 is rocked to close the ball 30 against the seat 29. At the same time, switch member 21 is rocked to bring the extensions 78 into contact with the extensions 76 of switch member 23, and instantly the motor is started at high speed to instantly set up fluid circulation for applying the brakes. It will be noted that the first action is to move 31 in clockwise direction and afterwards that members 31 and 26 move in unison in counter-clockwise direction. In other words, the initial motion of 31 is in a direction the reverse of its motion after pressure is set up.

The degree of amplification of braking pressure depends upon the amount of pressure on the ball 30, obtained by extension 31. If the pressure is not sufficient to seat the ball to prevent seepage, then a part of the fluid must pass the ball 30 and flow back through port 41 to the low-pressure or intake side of the pump. As additional pressure is applied, the ball is held more tightly in the seat 29, less seepage or none occurs, and pressure is then set up against the area 84 (see Figure 4) of the vane 26 the movement of which, of course, correspondingly moves rock shaft 8, and arm 13 and through pin 72 acts on the brake rod 71, to set the brake. On application of force through the rod 75, the upper end of the lever 64 moves in counter-clockwise direction, or in the same direction as the pedal, the element 60 moves in clockwise direction and, as a result of the pressure set up, the element 13 moves in counter-clockwise direction which is also the motion direction of the pedal to brake-applying position. The motion of element 13 sets the brakes (or operates any other suitable mechanism). It is further noted that the movement of the lever 64 causes the arm 60, shaft 17, and member 31, to have a more rapid angular movement than the arm 13, shaft 8 and vane 26, to again permit the ball 30 to be unseated sufficiently to prevent further movement of the vane 26 and connected brake elements. This movement is relatively slight and is not sufficient to open the switch. It is only on total release of pedal pressure and return of the pedal to its initial or non-braking position that the switch is opened, because it is desired to have the motor or power device operative immediately as the pedal is depressed, and throughout the braking movement of the pedal.

As long as the pressure is applied to the brake pedal the switch remains closed, so that the motor is operated to provide brake-assisting power, see Figure 2. As long as pressure is applied, elements 60 and 67 remain in the dotted line position shown in Figure 2 to maintain a closed circuit. When the pedal is released the spring 34 acts to move the element 31 in counter-clockwise direction to open the switch.

The pressure exposed area of the ball 30 is substantially twenty per cent of the area 84, and this means that whatever the pressure against the area 84, twenty per cent of the amount is transferred to the members 31, 24, 18, 17, 60 and 64, against the pedal pressure. This is necessary so that the driver may have complete "feel" control, which shall be proportional to the degree of pressure and to the degree of stroke of the pedal 74.

The chamber 3 is first filled (see Figures 1 and 4) with fluid through the fitting 85 into which the pipe connection 86 from the gas engine lubricating circuit 87 delivers. This connection is made preferably on the low pressure side 88 of the lubricating filter 89. To permit displaced air to escape during fluid flow through the pipe 86 into the chamber 3, there is provided a needle air bleeder valve 90 in the fitting 85 which is opened slightly to facilitate fluid flow from the gas engine lubricating system into the chamber 3. In initially filling the chamber 3 with oil, the valve 90 is open sufficiently to permit displacement of air through the passages 90a, so that the oil may flow into the chamber. When the chamber 3 and the pump and its passages are all filled with oil, the air bleeder valve 90 is closed and replenishment of fluid thereafter is entirely automatic, because only enough oil can flow in the chamber 3 to replace that which has leaked out. If any air is left in the fluid, it will escape through 85 and pipe 86, because of the pitch of the connections, and dissipate itself in the gas engine lubricating circuit. The replenishment connection is a valuable feature.

It will be noted that the oil supply for the pump is obtained by gravity from the low pressure or gravity side of the engine lubricating system, as distinguished from the crank case. I believe myself the first in this art to make a connection like that of 86, from the lower side of the lubricating system either adjacent or not adjacent the filter, to an auxiliary power device for any purpose in which the power device has its own fluid circuit and I claim particularly this use in conjunction with an auxiliary fluid operable power device for brake assisting purposes.

For mounting the amplifier unit, suitable studs (not shown) are provided on the body 2 on the switch side, and fit in holes in a bracket (not shown), the bracket being either mounted on the transmission case or bolted to the motor car frame at any convenient point.

The unit may be quickly installed at small expense, and the pump is electrically operated normally at a current consumption which is considerably less than the charging rate of the average generator, and, therefore, the additional battery load is negligible. The electrical connections are short and easy to make. The small size of a unit, of such high pressure capacity is possible only because of the exceptionally high speeds of the pump gears. Because of the small size of the pump gear teeth, the impulses are so continual that the noise usually made by pump gears is practically eliminated, and the device is, therefore, substantially noiseless in operation.

Although all details of construction are also claimed, yet I do not, of course, limit the broader aspects of the invention to the precise constructions shown.

By an inspection of Figure 1, it will be noted that the axes of rotation (or the operating axes) of the control members are concentric, and perpendicular to the long axis of the transmission casing, and are horizontally disposed. These concentrically related valve control members, therefore, have their control axes extending crosswise of the automobile, and the unit is arranged laterally at one side of the transmission case. In this way, the control members operating members 13, 67 and 60 are radial and move in planes which are parallel with, or are substantially in the same plane as the planes of movement of the pedal and brake rod 71.

I claim as my invention:

1. A power amplifier for internal combustion motor car controls, comprising a unit having an electric motor driven fluid pressure pump and a fluid circuit therefor, a first rock-shaft having a member against which the fluid pressure acts, a port in said member, a valve for restricting the free flow of fluid through said port, an arm for controlling said valve, a second rock-shaft concentric with the first for operating said arm, connections for the rock-shafts by means of which the pedal closes said valve and by which the valve-controlled member transmits power to a motor car control, and an electric switch for controlling the motor, one member of which is secured to one rock-shaft, and the other member to the other rock-shaft, said switch being adapted to close the motor circuit when pressure is applied on the pedal to operate said valve.

2. In a device of the class described, a fluid circulating system and electrically operable means for controlling it, a chamber as part of the circulating system, a first rock-shaft having a radial vane within said chamber against which fluid pressure acts, said vane having a passage as a part of the fluid circuit, which when blocked causes said vane to be moved, a valve controlling said passage, a second rock shaft having a radial element for controlling the valve, and means inter-connecting said rock shafts for giving a short initial motion to the second shaft to close the valve, and switching means controlled by said shafts to assume circuit-closed position on or before closure of the valve, said switch controlling a circuit for said electrically operable fluid pressure controlling means to generate pressure on switch closure.

3. In a device of the class described, a fluid circulating system and means for controlling it, a chamber as part of the circulating system, a first rock-shaft having a radial vane within said chamber against which fluid pressure acts, said vane having a passage as part of the fluid circuit, which when blocked causes said vane to be moved, a valve controlling said passage, a second rock-shaft having a radial element for controlling the valve, and a motion-reversing connection between said rock-shafts by which the second shaft is initially given a short motion in a direction opposite to that of vane motion to close the valve.

4. In a device of the class described, a fluid circulating system and means for controlling it, a chamber as part of the circulating system, a first rock-shaft having a radial vane within said chamber against which fluid pressure acts, said vane having a passage as a part of the fluid circuit, which when blocked causes said vane to be moved, a ball controlling said passage, a second rock-shaft having a radial element for moving the ball to block the passage, and a motion-reversing connection between said rock-shafts by which the second shaft is initially given a short motion in a direction opposite to that of vane motion to seat the ball.

5. A device of the class described including a brake pedal and brake, a fluid circulating system and electrically operable means for controlling it, a chamber as part of the circulating system, a first rock-shaft having a radial vane within said chamber against which fluid pressure acts, said vane having a passage as part of the fluid circuit, which when blocked causes said vane to be moved, a ball controlling the outlet end of said passage, a second rock-shaft journaled within the first in axially concentric relation thereto and having a radial element for moving the ball to block the passage by motion in a direction opposite to the motion of the vane, a motion-reversing connection between said rock-shafts by which the second shaft is initially given a short motion in a direction opposite to that of vane motion to seat the ball, said connection including an arm attached to the first rock shaft, and a part fulcrumed upon said arm, and directly connected to the brake pedal, the direction of motion of the arm being the same as the brake pedal, and switching means controlled by said shafts to assume circuit-closed position on or before the seating of the ball, said switch controlling a circuit for said electrically operable fluid pressure controlling means to generate pressure on switch closure.

6. A device of the class described including a pedal, a brake, electrically operable fluid pressure means, means for controlling said last mentioned means including first and second rock-shafts, the first having a radial vane which is moved by fluid pressure to apply the brake, valve means which controls the action of the fluid on said vane, means operable by the second shaft for controlling the valve means, a radial arm for the first shaft connected to the brake, a radial arm for the second shaft opposed to the first mentioned radial arm, a lever pivoted to the first mentioned radial arm, and having one arm connected to the brake pedal, means by which the opposite arm of the lever acts on the second radial arm to obtain closure of the valve and switching means operable by the shaft for electrically initiating fluid pressure immediately before or as the valve is closed.

7. A device of the class described including a pedal, a brake, a casing and electrically operable fluid pressure initiating means carried thereby, means for controlling said last mentioned means including first and second rock-shafts concentrically journaled one within the other, the first having a radial vane which is moved by fluid pressure to apply the brake, valve means which controls the action of the fluid on said vane, means operable by the second shaft for controlling the valve means, a radial arm for the first shaft connected to the brake, a radial arm for the second shaft opposed to the first mentioned radial arm, a lever pivoted to the first mentioned radial arm, and having one arm connected to the brake pedal, means by which the opposite arm of the lever acts on the second radial arm to obtain closure of the valve, and switching means operable by the shafts for electrically initiating fluid pressure immediately before or as the valve is closed.

8. A device of the class described including a pedal, a brake, a casing and electrically operable fluid pressure initiating means therein, means for controlling said last mentioned means including first and second rock-shafts concentrically journaled one within the other, the first having a radial vane which is moved in one direction by fluid pressure to apply the brakes, valve means which controls the action of the fluid on said vane means operable by the second shaft for controlling the valve means and adapted to control said valve means and to initially move in a direction opposite to the vane to operate the valve means to obtain fluid pressure action on the vane, a radial arm for the first shaft connected to the brake, a radial arm for the second shaft opposed to the first mentioned radial arm, a lever pivoted to the first mentioned radial arm outwardly beyond the end of the second radial arm having its outer end connected to the brake pedal, means by which the opposite arm of the lever acts on the second radial arm to obtain closure of the valve and switching means operable by the shaft for electrically initiating fluid pressure immediately before or as the valve is closed.

9. A power amplifier for internal combustion motor car controls comprising a unit having an electric motor driven fluid pressure pump and a fluid circuit therefor, a first rock shaft connected by an arm to the vehicle member to be moved and having a radial member against which fluid pressure acts, a port in said member, a valve for restricting the free flow of fluid through said port, a radial arm for controlling said valve, a second rock shaft concentric with the first for operating said arm, a cantilever pivoted on the arm on the first rock shaft and connected at one end to a pedal and at the opposite end operatively connected to an arm on the second rock shaft to cause reverse motion between the first rock shaft and the second rock shaft, upon pedal movement.

10. A device of the class described comprising a brake pedal, a brake, a casing having upper and lower chambers, first and second rock shafts one within the other journaled in the casing and passing through the upper chamber and projecting outwardly beyond the casing at both sides, the first shaft having a radial abutment which is moved by fluid pressure to apply the brake, valve means which controls the action of the fluid on the abutment, a radial arm operable by the second shaft for controlling the valve means, a radial arm for the first shaft connected to the brake, a radial arm for the second shaft, a lever pivoted on the first arm and having one arm connected to the brake pedal, means by which the opposite arm of the lever acts on the second radial arm to obtain closing of the valve, and switching means outside of the casing on the projecting ends of said shafts and operable by the shafts for electrically initiating fluid pressure, said switch adapted to remain closed as long as pressure is applied to the pedal.

11. A pumping unit having a fluid circulating system, means for controlling flow in the system and means for transmitting power as a result of obstruction of flow by said means, said pumping unit including a chamber having a block removably disposed therein, said block having pump gears mounted thereon for generating fluid pressure in the system, an electric motor having a casing having an extension removably fitting in and closing said chamber, and means by which the motor shaft is directly coupled to one of the gear shafts, said means being attachable or detachable by movement of the motor casing in axial direction, said motor shaft abutting said gear shaft.

12. A pumping unit having a fluid circulating system, means for controlling flow in the system and means for transmitting power as a result of obstruction of flow by said means, said pumping unit including a chamber having a block removably disposed therein, said block having pumping gears mounted thereon for generating fluid pressure in the system, an electric motor having a casing having an extension removably fitting in and closing said chamber as a stopper, and directly securing the block against outward axial motion, the motor shaft being axially aligned with and substantially abutting a shaft of one of said gears, and detachable means by which the motor shaft drives said gear shaft.

13. A brake control for power propelled vehicles comprising a pedal, a pumping unit having a fluid circulating system, relatively movable valve and valve seat members as part of the circulating system adapted to control the flow, connections between the pedal and one of the members for moving that member to prevent fluid flow, the other member being connected to brake-applying means for transmitting power thereto, said pump including a chamber having a block removably disposed therein, said block having pump gears mounted thereon for generating fluid pressure; an electric motor having a casing having an extension fitting in and closing said chamber as a stopper, the motor shaft being axially aligned with and substantially abutting the shaft of one of said gears, and means by which the motor shaft drives said gear shaft, said means being attachable or detachable by movement of the motor casing in axial direction.

14. In a device of the class described, a fluid circulating system and means for controlling it, a chamber as part of the circulating system, a first shaft having a vane within the chamber against which the fluid pressure acts, said vane having a passage as part of the fluid circuit which when blocked causes said vane to be moved, a valve for blocking said passage, a second shaft having an element for moving the valve to block the passage, and means interconnecting the shafts for giving a short initial motion to the second shaft to close the valve.

15. In a device of the class described, a fluid circulating system and means for controlling it, a chamber as part of the circulating system, a first shaft having a radial vane within the chamber against which the fluid pressure acts, said vane having a passage as part of the fluid circuit which when blocked causes said vane to be moved, a valve for blocking said passage, a second shaft having a radial element for moving the valve to block the passage, means interconnecting the shafts for giving a short initial motion to the second shaft to close the valve, and switching means controlled by said shafts and said shaft-interconnecting means to assume and be maintained in circuit-closed position during operation of said inter-connecting means and means by which the switch controls the fluid-circulating system controlling means.

16. A casing providing upper and lower chambers, telescopic shafts first and second sealingly traversing the walls of the casing and said upper chamber, each shaft having an electrical contact disk movable therewith, said disks being cooperable to control an electric switching operation, the first shaft having a radial member against which fluid pressure in the upper chamber acts, a port in said member, a valve for controlling the port, means on the second shaft for controlling the valve, each of the shafts having an arm at the outer side of the casing, a lever pivoted to the arm of the first shaft, operating means connected to outermost arm of the lever, means by which the opposite arm cooperates with the arm of the second shaft to obtain closure of the valve and switch-closing movement of the disks on movement of the lever in one direction, a fluid pump in the lower chamber and a fluid circuit therefor including said upper chamber and port, an electric motor for the pump and electrical connections by which the switch controls the motor.

17. A casing providing upper and lower chambers, telescopic shafts first and second sealingly traversing the walls of the casing and said upper chamber, each shaft having an electrical contact disk movable therewith, said disks being cooperable to control an electric switching operation, the first shaft having a radial member against which fluid pressure in the upper chamber acts, a port in said member, a valve for controlling the port, means on the second shaft for controlling the valve, each of the shafts having an arm at the outer side of the casing, a lever pivoted to the arm of the first shaft, operating means connected to the outermost arm of the lever, means by which the opposite arm cooperates with the arm of the second shaft to obtain closure of the valve and switch-closing movement of the disks on movement of the lever in one direction, a fluid pump in the lower chamber and a fluid circuit therefor including said upper chamber and port, an electric motor for the pump having a support a portion of which closes the second chamber and electrical connections by which the switch controls the motor, the axes of the first mentioned shafts and of the motor being substantially perpendicular to one another and horizontally arranged when the device is in operative position.

18. A pumping unit having a fluid circulating system including upper and lower cylindrical chambers having their axes at right angles to one another and horizontally disposed when the device is in operative position, means for controlling flow in the system and means for transmitting power as a result of obstruction of flow by said means, said lower chamber having a block removably disposed therein, said block having pumping gears and passages therein for generating fluid pressure in the system, an electric motor having a casing having an extension removably fitting said lower chamber as a stopper and acting directly to secure the block against outward axial motion, means accessible from the outer side of the casing for holding the block against rotation, means for holding the extension of said casing against rotation and translation, and means by which the motor shaft abuts and is directly coupled to one of the gear shafts, said means being attachable and detachable by movement of the motor casing in an axial direction.

19. A fluid power actuator mechanism including a power input controlling member and a power output member, means for generating fluid pressure, and a valve for controlling said fluid pressure, said means for generating fluid pressure comprising a round chamber, a round casing in said chamber, said casing having pump gears mounted therein, a drive member for the gears, said casing having fluid inlet and outlet passages operatively associated with said gears, the axis of said casing being concentric with the axis of said drive member, an electric motor having a round mounting member concentric with its drive shaft, driving connections between the motor drive shaft and the pump drive member, said round electric motor mounting member being mounted in said round chamber, means for holding said pump casing against rotation within said round chamber, and means for holding said electric motor mounting member securely within said round chamber.

20. A fluid power actuator mechanism including a power input controlling lever and a power output lever, on the movable part of which the input controlling lever is pivoted, means for generating fluid pressure adapted to be applied to the output lever, a pivotal means adapted to receive and react to the liquid under pressure and being connected to the output lever, a valve for controlling said fluid pressure, said input controlling lever having cooperating therewith a valve-operating lever means rotatable in the opposite direction to the input controlling lever for causing a part of the input effort to be applied for operating the valve, and a part of said effort to be directly applied for operating the output actuating lever, said valve-operating lever means including means operable to provide an initial independent movement for said valve opposed to the power movement of said output lever and to supply a continuous force opposed to the power movement of the output lever and proportional to the fluid pressure required for moving the output lever.

21. A fluid power actuator mechanism including a power input controlling lever and a power output lever on the movable part of which the input controlling lever is pivoted, means for generating fluid pressure adapted to be applied to the output lever, a pivotal means adapted to receive and react to the liquid under pressure and being connected to the output lever, a valve for controlling said fluid pressure, said input controlling lever having cooperating therewith a valve operating lever means rotatable in the opposite direction to the input controlling lever for causing a part of the input effort to be applied for operating the valve and a part of said effort to be directly applied for operating the output lever, said valve operating lever means including means operable to provide an initial independent movement for said valve opposed to the movement of said output lever and to supply a continuous force opposed to the power movement of the output lever and proportional to fluid pressure required for moving the output lever, part of said input valve operating lever means having a fulcrum in common with said output lever, and both the input controlling lever and the output lever having connections projecting at one side of the power actuator mechanism.

22. A fluid power actuator mechanism including a power input controlling lever and a power output lever, on the movable part of which the input controlling lever is pivoted, means for generating fluid pressure including a motor adapted to be applied to the output lever, a pivotal means adapted to receive and to react to the liquid under pressure and being connected to the output lever, a valve for controlling said fluid pressure, said input controlling lever having cooperating therewith a valve operating lever means rotatable in the opposite direction to the input controlling lever for causing a part of the input effort to be applied for operating the valve and a part of said effort to be directly applied for operating the output lever, said valve operating lever means including means operable to provide an initial independent movement for said valve opposed to the movement of said output lever and to supply a continuous force opposed to the power movement of the output lever and proportional to the fluid pressure required for moving the output lever, an electric circuit for said motor including a switch, and means by which said switch is automatically controlled by a moving part in the power actuator mechanism.

23. A fluid power actuator mechanism including a power input controlling lever and a power output lever, on the movable part of which the input controlling lever is pivoted, said lever being pivotally and concentrically related, means for generating fluid pressure adapted to be applied to the output lever, a pivotal means adapted to receive and react to the liquid under pressure and being connected to the output lever, a valve for controlling said fluid pressure, said input controlling lever having cooperating therewith a valve operating lever means rotatable in the opposite direction to the input controlling lever for causing a part of the input effort to be applied for operating the valve and a part of said effort to be directly applied for operating the output lever, said valve operating lever means including means operable to provide an initial independent movement for said valve opposed to the movement of said output lever and to supply a continuous force opposed to the power movement of the output lever and proportional to the fluid pressure required for moving the output member, and a spring for resisting said opposed force.

24. A fluid power actuator mechanism including a power input controlling lever and a power output lever, on the movable part of which the input controlling lever is pivoted, means for generating fluid pressure adapted to be applied to the output lever, a pivotal means adapted to receive and react to the liquid under pressure and being connected to the output lever, a valve for controlling said fluid pressure, said input controlling lever having cooperating therewith a valve operating lever means rotatable in the opposite direction to the input controlling lever for causing a part of the input effort to be applied for operating the valve and a part of said effort to be directly applied for operating the output lever, said valve operating lever means including means operable to provide an initial independent movement for said valve opposed to the movement of said output lever, and to supply a continuous force opposed to the output lever and proportional to the fluid pressure required for moving the output lever.

25. A fluid power actuator comprising a source of pressure fluid, a valve for controlling pressure applied thereby, an input lever for controlling said pressure, an output lever adapted to be moved by the fluid pressure applied thereto on the movable portion of which the input lever is pivoted, a pivotal means adapted to receive and react to the liquid under pressure and being connected to the output lever, and a lever for operating said valve cooperating with the input lever and rotatable in the opposite direction thereto and pivoted on the axis of the output lever.

26. A fluid power actuator comprising a source of pressure fluid, a valve for controlling pressure applied thereby, an input lever for controlling said pressure, an output lever adapted to be moved by the fluid pressure applied thereto on the movable portion of which the input lever is pivoted, a pivotal means adapted to receive and react to the liquid under pressure and being connected to the output lever, and a lever for operating said valve cooperating with the input lever and rotatable in the opposite direction thereto and pivoted on the axis of the output lever, and having a shaft extending within the output lever.

27. A fluid power actuator comprising a source of pressure fluid, an input lever for controlling said pressure, an output lever adapted to be moved by the fluid pressure applied thereto on the movable portion of which the input lever is pivoted, a pivotal means adapted to receive and react to the liquid under pressure and being connected to the output lever, a valve operating lever cooperating with the input lever and rotatable in the opposite direction thereto and pivoted on the axis of the output lever, a casing having a liquid-pressure-applying controlling chamber containing a movable member attached to the output lever and having a valve in the movable member for controlling said pressure, and a movable valve operating member in said chamber attached to the valve lever.

28. A fluid power actuator comprising a source of pressure fluid, an input lever for controlling said pressure, an output lever adapted to be moved by the fluid pressure applied thereto on the movable portion of which the input lever is pivoted, a pivotal means adapted to receive and react to the liquid under pressure and being connected to the output lever, a valve operating lever cooperating with the input lever and rotatable in the opposite direction thereto and pivoted on the axis of the output lever, a casing having a liquid-pressure-applying controlling chamber containing a movable member attached to the output lever and having a valve in the movable member for controlling said pressure, a movable valve operating member in said chamber attached to the valve lever, and a reservoir and filter means for said fluid communicating with said chamber.

29. A fluid power actuator comprising a source of pressure fluid, an input lever for controlling said pressure, an output lever adapted to be moved by the fluid pressure applied thereto on the movable portion of which the input lever is pivoted, a pivotal means adapted to receive and react to the liquid under pressure and being connected to the output lever, a valve operating lever cooperating with the input lever and rotatable in the opposite direction thereto and pivoted on the axis of the output lever, a casing having a liquid-pressure-applying controlling chamber containing a movable member attached to the output lever and having a valve in the movable member for controlling said pressure, a movable valve operating member in said chamber attached to the valve lever, and a reservoir for said fluid connected to the said chamber but located remotely therefrom.

30. A fluid power actuator, comprising, a source of pressure fluid, a valve for controlling pressure applied thereby, an input lever for controlling said pressure, an output lever, on the movable portion of which the input lever is pivoted, and a lever for operating said valve, cooperating with the input lever and pivoted on the pivot of the output lever, said output lever and valve operating lever having seals, held in place by the levers, on the pivots.

EDWIN G. STAUDE.